United States Patent [19]

O'Sullivan

[11] Patent Number: 4,534,817
[45] Date of Patent: Aug. 13, 1985

[54] AUTOMATIC BUNDLE-TYING TOOL

[76] Inventor: Denis P. O'Sullivan, 91 Shelter Rock Rd., Danbury, Conn. 06810

[21] Appl. No.: 483,124

[22] Filed: Apr. 8, 1983

[51] Int. Cl.³ .................. B65B 13/06; B65B 13/32
[52] U.S. Cl. ................... 156/352; 53/589;
100/26; 100/33 PB; 140/93.2; 156/353;
156/358; 156/378; 156/495; 156/579;
156/580.1; 156/580.2
[58] Field of Search .............. 156/73.1, 352, 353,
156/358, 361, 378, 468, 495, 579, 580.1, 580.2;
100/26, 33 PB; 140/93.2; 53/589

[56] References Cited

U.S. PATENT DOCUMENTS

| | | | |
|---|---|---|---|
| 3,391,440 | 7/1968 | Harms | 140/93.2 |
| 4,094,342 | 6/1978 | Nishikawa et al. | 140/93.2 |
| 4,178,973 | 12/1979 | Collier et al. | 140/93.2 |
| 4,265,687 | 5/1981 | Mercer et al. | 100/33 PB |
| 4,368,762 | 1/1983 | Peterpaul | 140/93.2 |
| 4,371,010 | 2/1983 | Hidassy | 140/93.2 |

Primary Examiner—Michael Wityshyn

Attorney, Agent, or Firm—Mattern, Ware, Stoltz & Fressola

[57] ABSTRACT

An automatic bundle-tying tool has a compact housing with a pair of curved pincer-shaped jaws, one of which pivots outward to accommodate a bundle of wires or similar elongated objects, and then pivots inward to abut the other, fixed jaw. Plastic tying tape drawn from a storage spool is fed around the tape guide groove formed on the internal surface of each of the mating jaws, encircling the bundle. A pair of thin tapered anvils clamp the overlapped tape against the tip of an ultrasonic welding transducer, and a reverse feed mechanism draws the tape tight around the bundle while slack tape is re-wound on the storage spool by a resilient spring biased spool hub. After ultrasonic welding, automatic spring-driven linkages unclamp and withdraw the anvils, sever the tied bundle from the tape supply and open the movable jaw to release the tied bundle. A preferred embodiment is lightweight, portable and easy to operate.

17 Claims, 22 Drawing Figures

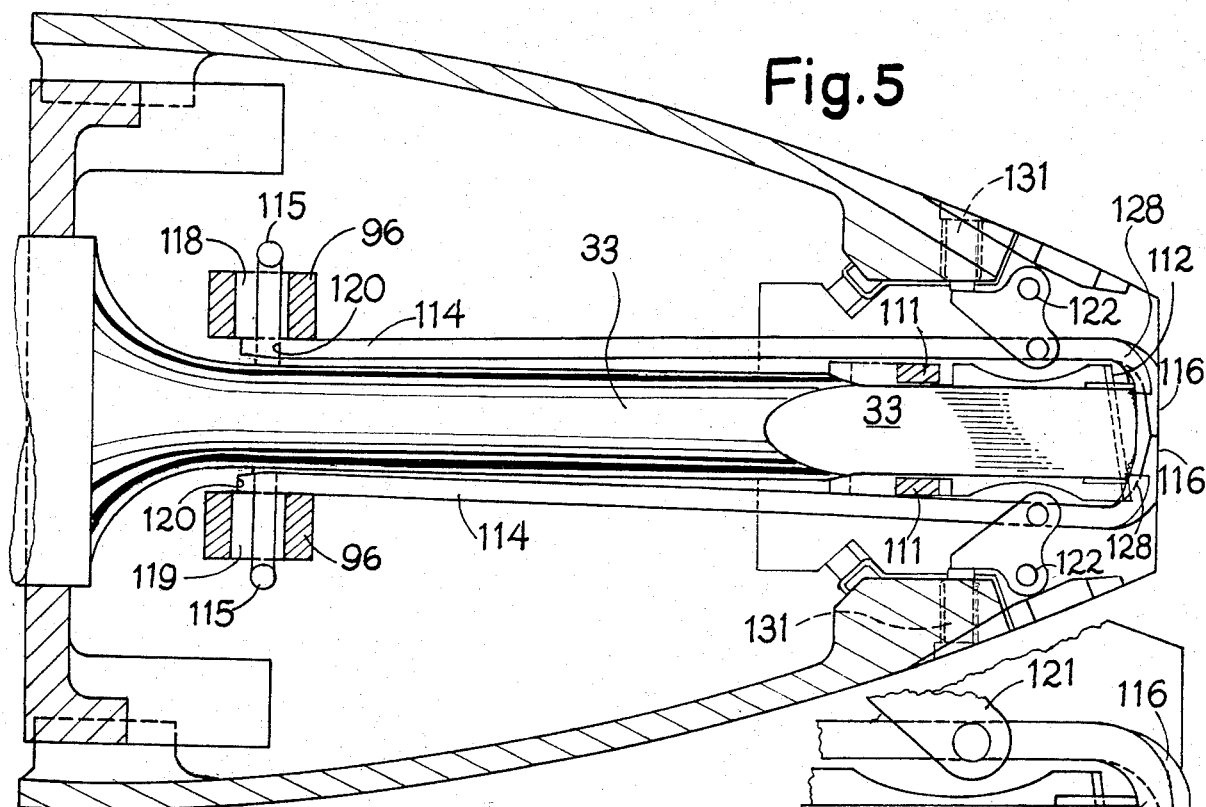
Fig. 5
Fig. 6
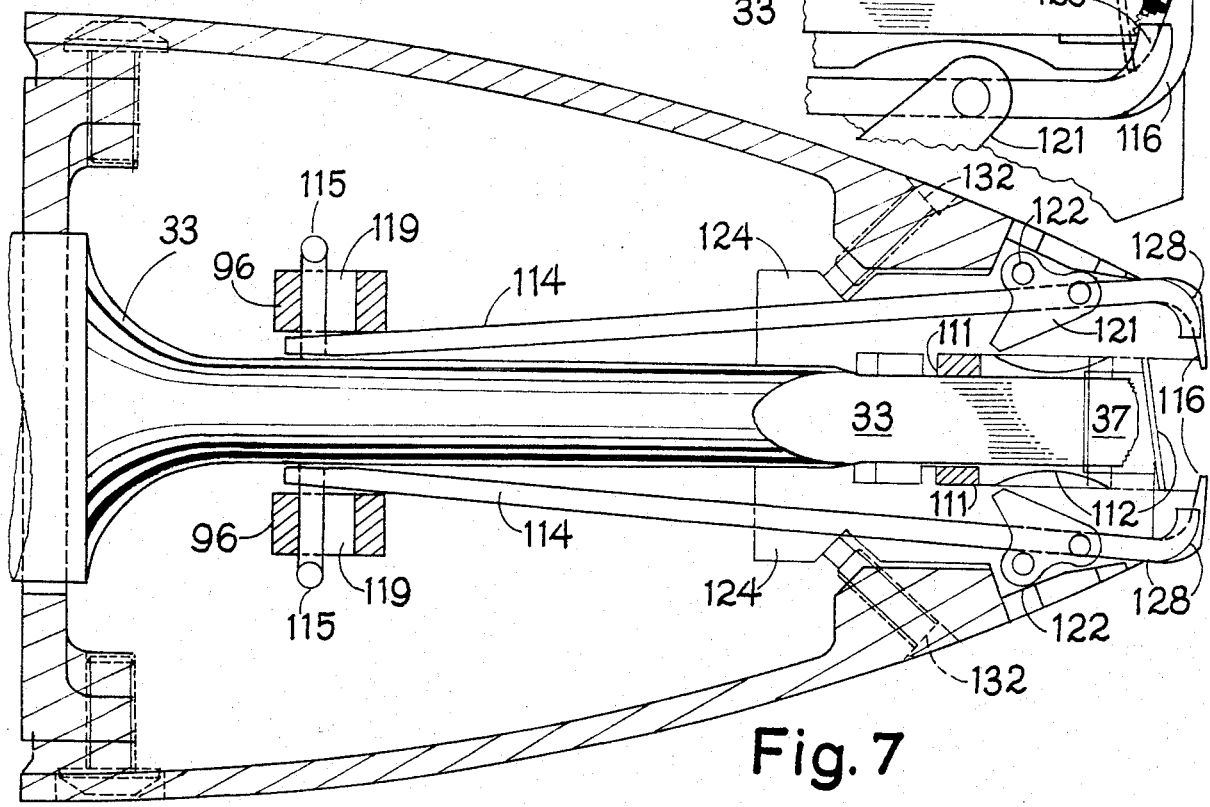
Fig. 7

AUTOMATIC BUNDLE-TYING TOOL

The subject matter of my invention disclosure entitled Improvements to Ultrasonic Tie Wrapper (Wire) filed in the U.S. Patent and Trademark Office June 24, 1981 as Disclosure Document No. 100860 forms the basis for portions of the subject matter disclosed and claimed herein.

This invention relates to bundle tying devices used to strap together coils or bundles of elongated objects, stems or vines, moldings, rods, tubes and extrusions, or wires used in forming wiring harnesses for aircraft, motor vehicles, machine tools, electronic consoles or appliance wiring, and particularly to portable ultrasonic tape welding devices capable of wrapping, tightening, bonding and severing a tape wrap for tightly strapping a bundle of electrical wire conductors together in convenient, speedy and repetitive fashion.

In order to avoid the need for manual strapping and tying of wire or tape around bundles of electrical conductors to secure wiring harnesses together at numerous points along their length, several tying or strapping devices designed as portable hand tools for production line use have been proposed in United States patents, such as U.S. Pat. No. 4,265,687 to Paul W. Mercer and Howard B. Stock, issued in 1981, U.S. Pat. No. 4,368,762 issued to Joseph Peterpall in 1983, and U.S. Pat. Nos. 4,371,010 and 4,371,011, issued to Laszlo Hidassy in 1983. These devices have proved to be heavy, bulky and less reliable than the user might desire, or to be limited to preformed plastic ties, fed from a magazine. Accordingly, with the increasing use of computers and multiprocessors in controlling vehicles, office equipment and appliances, an increasing and intensifying need has been found for lightweight, compact and thoroughly reliable tie-making devices which are easily portable, conveniently maneuverable into tight corners and capable of producing numerous bundle-wrapping ties of predetermined, compact tightness in quick succession with a minimum of adjustment by the user.

Conventional ultrasonic tape welding devices have required insertion of a single anvil between the tape and the bundled conductors to clamp the tape against the transducer tip, interfering with the bundle, reducing its tightness and tending to disarrange the bundled conductors. The clamping load applied to hold the tape against the transducer tip has proved difficult to control in such devices and guiding of the multiple turns of tape forming the wrap to form a smooth, uniform strapping around the bundle's periphery has proved extremely difficult. It has not been possible heretofore to tie bundles of a few, small conductors, as the removal of the anvil from the bundle resulted in an unsatisfactory loose bundle.

The use of such conventional devices to tie bundles containing but a few conductors has produced an unsatisfactory loose tie. Manual operation of the trigger mechanism to provide the cutting force required to sever the tape has produced undesirable fatigue on the part of the operators of these manual devices. Threading of a fresh roll of tape into such devices as that proposed in U.S. Pat. No. 4,265,687 has proved difficult in many cases, and a convenient tape-loading mechanism has been needed.

Accordingly, a principal object of the present invention is to provide lightweight, portable ultrasonic tying devices for wrapping bundles of electrical conductors compactly with predetermined wrapping tension, which are capable of repeated and reliable wrapping operations in quick succession.

Another object of the invention is to provide such lightweight, portable tying devices in which wrapping tape is easily loaded with a minimum of time and effort.

A further object of the invention is to provide such lightweight automatic tying devices in which the finger-pull exerted by the user is minimized with the arming, cocking, tape tightening and tape severing operations all being performed automatically by the mechanism, without the need for manual force to be applied by the user, all in successive response to the light manual force applied only to close the tape guiding jaws around the bundle of conductors to be wrapped.

Another object of the invention is to provide such lightweight automatic tying devices with spring-biased rewinding spool mechanisms supporting tape reels and cooperating with a tape tautening operation during bundle wrapping, taking up all slackness in the tautened tape to avoid tape tangling or the need for manual straightening.

A further object of the invention is to provide such lightweight automatic tying devices provided with internal monitoring of bundle size to abort the operation if the user attempts to tie a bundle of a size predetermined as too small for satisfactory wrapping.

Another object of the invention is to provide such lightweight portable automatic tying devices incorporating a pair of articulated anvils positioned for complete or partial lateral insertion between the wrapping tape and the bundled conductors simultaneously from both sides, minimizing the dislodgement or interference with the conductor positioning of the bundle and producing bundles of optimum predetermined wrapping tautness.

Another object of the invention is to provide a tie or loose band such as might be used to hold tags on items of apparel or loops by which objects may be hung or anchored.

Other objects of the invention will in part be obvious and will in part appear hereinafter.

The invention accordingly comprises the features of construction, combinations of elements and arrangement of parts which will be exemplified in the constructions hereinafter set forth, and the scope of the invention will be indicated in the claims.

For a fuller understanding of the nature and objects of the invention, reference should be had to the following detailed description taken in connection with the accompanying drawings.

BRIEF SUMMARY OF THE INVENTION

The ultrasonic bundle-wrapping and tying devices of this invention incorporate a lightweight metal or plastic housing having a depending pistol grip from which a power cable extends downward, provided with a trigger at the top of the pistol grip. The forward end of the tying device is tapered down to a thin ring-shaped pair of curved jaws, one of which is movable pivotally to swing aside, opening the space between the jaws to permit the insertion of the bundle of conductive wires to be wrapped together. A light pressure on the trigger of the device closes and latches the jaws around the bundle and also initiates the operation of the mechanism. Torque produced by the drive motor is transmitted by a timing belt to a train of nip rollers which rotate through the predetermined number of revolutions required to advance one or more turns of plastic binding tape drawn from a spool at the rear of the device through the nip rollers. The tape is fed around the bundle guided by the closed jaws until at least one or more complete turns of tape encircle the bundle and the next tape turn has passed the transducer tip. When the needed amount of tape has been fed forward, the anvils are automatically closed by a retracting gear carrying a protruding pin engaging a spur on a retracting arm, and thus moving the arm rearwardly until it is cocked or latched in the position where its linkage connection via a pair of yokes to twin anvils has articulated the anvils sidewise and rearwardly inserting their tips between the bundled conductor wires and the several layers of tape, clamping the tape against the transducer tip. Transverse serrated ridges on the anvil faces anchor the innermost turn of tape against slipping.

The motor is then reversed and the nip rollers draw the outermost turns of tape tighter as they pull the excess tape back away from the bundle, automatically rewinding it on the rear spool, until the desired degree of wrapping tautness is achieved. This may be determined by sensing the increase in the motor current as it encounters the increasing load, or in one preferred embodiment by an optical sensor cooperating with a slipping clutch. Determination that the desired tautness of the tape wrap has been achieved then triggers the transducer for a brief burst of energy, and the several layers of tape sandwiched between the transducer tip and the clamping anvils are bonded together. After a brief cooling, the retracting arm is released by automatic opening of the jaws and the anvils at the same time that the cutter blade is automatically advanced by the linkage to sever the outermost turn of tape, releasing the wrapped bundle of conductors from the device which is thereby made ready for the next tie-wrapping operation.

Only light manual pressure is required on the trigger to close the movable jaw and initiate operation of the tying devices of this invention, which continue automatically to perform successive steps in the wrapping cycle without requiring additional manual force. Upon completion the movable jaw is automatically opened without any additional manual force being required from the operator.

The threading insertion of a fresh reel of tape in the device is simplified by the provision of a tape insertion slot in the side of the housing and by a removable door on the underside of the forward end opening the nip rollers for tape insertion. Slack tape released by the tape-tautening operation is automatically rewound on the tape reel by a rewinding spool provided at the rear end of the device.

Following manual closing of the jaws of the device by the force applied by the operator to pull the trigger, all remaining steps of the operating cycle are performed automatically by the mechanism, governed by its electronic control circuitry. After the cooling interval, a solenoid is actuated to unlatch the trigger, and compressed springs move the linkages inside the mechanism to open the jaws, to unclamp the anvils and to slice the outermost strip of tape with a shearing action to release the wrapped bundle of conductors from the device. The reinforced plastic tie-tape, wound on a spool at the rear end of the device is automatically maintained under tension, and slack tape produced by the tautening reverse motor operation is rewound on the tape spool because the supporting spool is provided with a tape rewind spring supplying rewinding torque to maintain tape tension.

A BRIEF DESCRIPTION OF THE DRAWINGS

FIGS. 2A and 2B are further enlarged fragmentary views of a portion of the cocking and latching mechanism of the device.

FIG. 5 is a greatly enlarged top plan cross-sectional view of the anvil and transducer mechanism and the retracting arm employed to close the anvils to the clamped position.

FIG. 6 is a still further enlarged fragmentary plan view of the anvils clamping three layers of tape against the forward tip of the transducer.

FIG. 7 is an enlarged top plan cross-sectional view corresponding to FIG. 5, showing the anvils in their open position with the retracting arm moved forward to open the tape-clamping anvils.

DESCRIPTION OF THE PREFERRED EMBODIMENT

Figure 1:
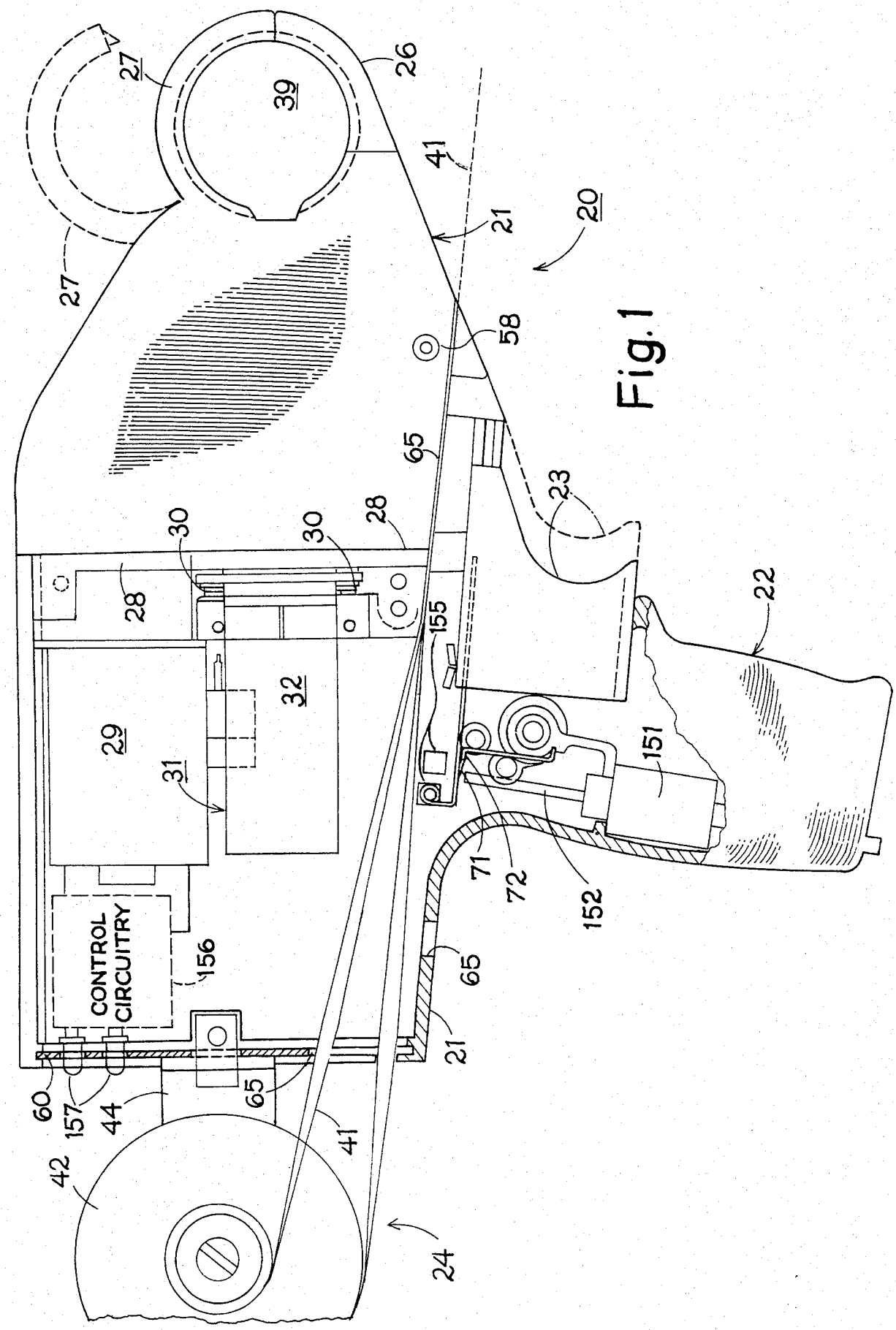
FIG. 1 is a side elevation view of the lightweight portable tying device exemplifying a preferred form of the present invention.

The ultrasonic tying devices of the present invention are exemplified by the tying device 20, shown in FIG. 1. This is a lightweight, portable device having a housing 21, a pistol grip 22, a finger-actuated trigger 23, a tape supporting spool 42 and a pair of jaws comprising a lower fixed jaw 26 and a pivotal moving upper jaw 27, shown in solid lines in FIG. 1 with its pivotally opened position being indicated by dashed lines.

Figure 2:
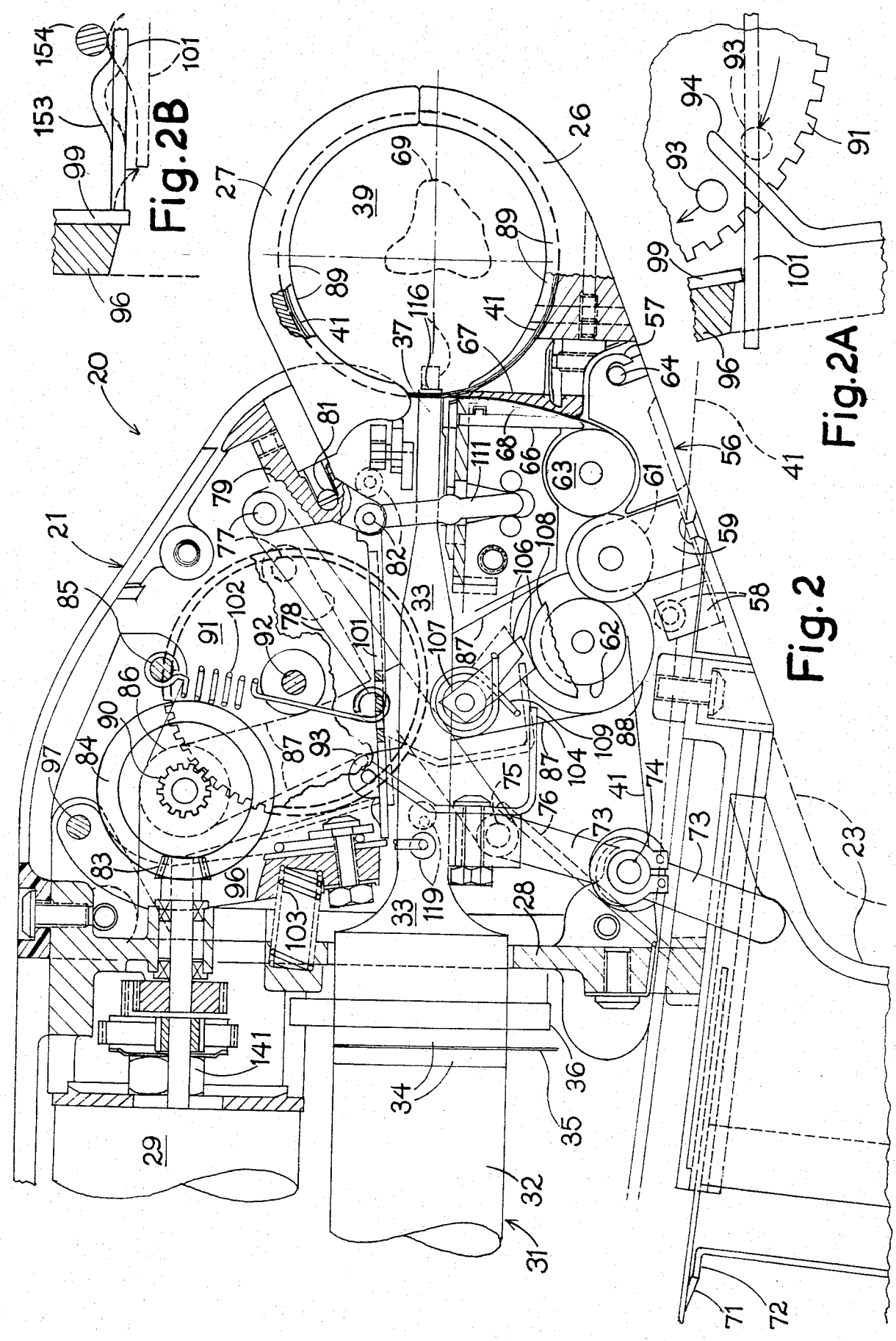
FIG. 2 is a fragmentary, enlarged cross-sectional view of the jaw, anvil and transducer portion of the device, showing the mechanism actuating the jaws and the anvils, as well as the tape feed, the tape tautening and the tape cut-off blade.

As indicated in FIGS. 1 and 2, the housing 21 is provided centrally with a substantially vertical internal partition wall 28. Mounted to the rear of wall 28 are the electronic control components and wiring, the drive motor 29, switches 30 and the ultrasonic transducer assembly 31, better shown in FIG. 2, comprising a back driver 32, a front driver 33 and two transducer crystals 34 sandwiching a high voltage terminal center disc 35, all sturdily bolted together by a central threaded clamping bolt and mounted on the rear side of the partition wall 28 by means of a transducer flange 36. The transducer front driver 33 is provided with a double raked or beveled tip having a vertical central forward ridge 37 and two laterally raked faces 38, having a rake angle of about 10 to 15 degrees from the transverse plane, and preferably incorporating serrated vertical ridges enhancing the welding efficiency of the transducer. These transducer tip features can be seen best in FIGS. 8 and 9.

The tip ridge and faces 37 and 38 of transducer front driver 33 extend forward into the peripheral region of a circular disc-shaped bundle zone 39 embraced by the fixed jaw 26 and movable jaw 27, when movable jaw 27 is in its closed full-line condition, as shown in FIG. 1.

Forward Tape-Feed Mechanism

The free end of the fiber-reinforced polymer wrapping tape 41 is drawn from the reel or spool 42 rotatably anchored at the rear end of the housing 21 on rearwardly protruding spool support arm 44 from which a transverse fixed hub spindle 43 projects laterally across the rear end of the device. Mounted on the spindle are two spool bearing discs 46, respectively journalled at each end of the hub spindle 43 and each telescoped inside an elongated tapered or conical spool drum 47, whose slack tape-rewinding operation will be further described hereafter.

Removable Tape-Threading Door

Removably positioned at the forward lower end of the housing is a door 56 with its forward end shaped in the form of a hook 57 and with a latch mechanism 58 mounted at its rear end. Rotatably mounted in a pair of upstanding trunnion brackets 59 on the upper inside surface of the door is a gear-toothed idler nip roller 61, having a tractive tape-driving rim surface dimensioned to interfit between a rearward motor-driven nip roller 62 and a forward guide roller 63, best shown in FIG. 2. The tractive nip rollers 61, 62 and 63 are centered in the housing, aligned for tape driving engagement to feed the tape 41 past transducer tip 37 and into jaws 26 and 27.

Figure 3:
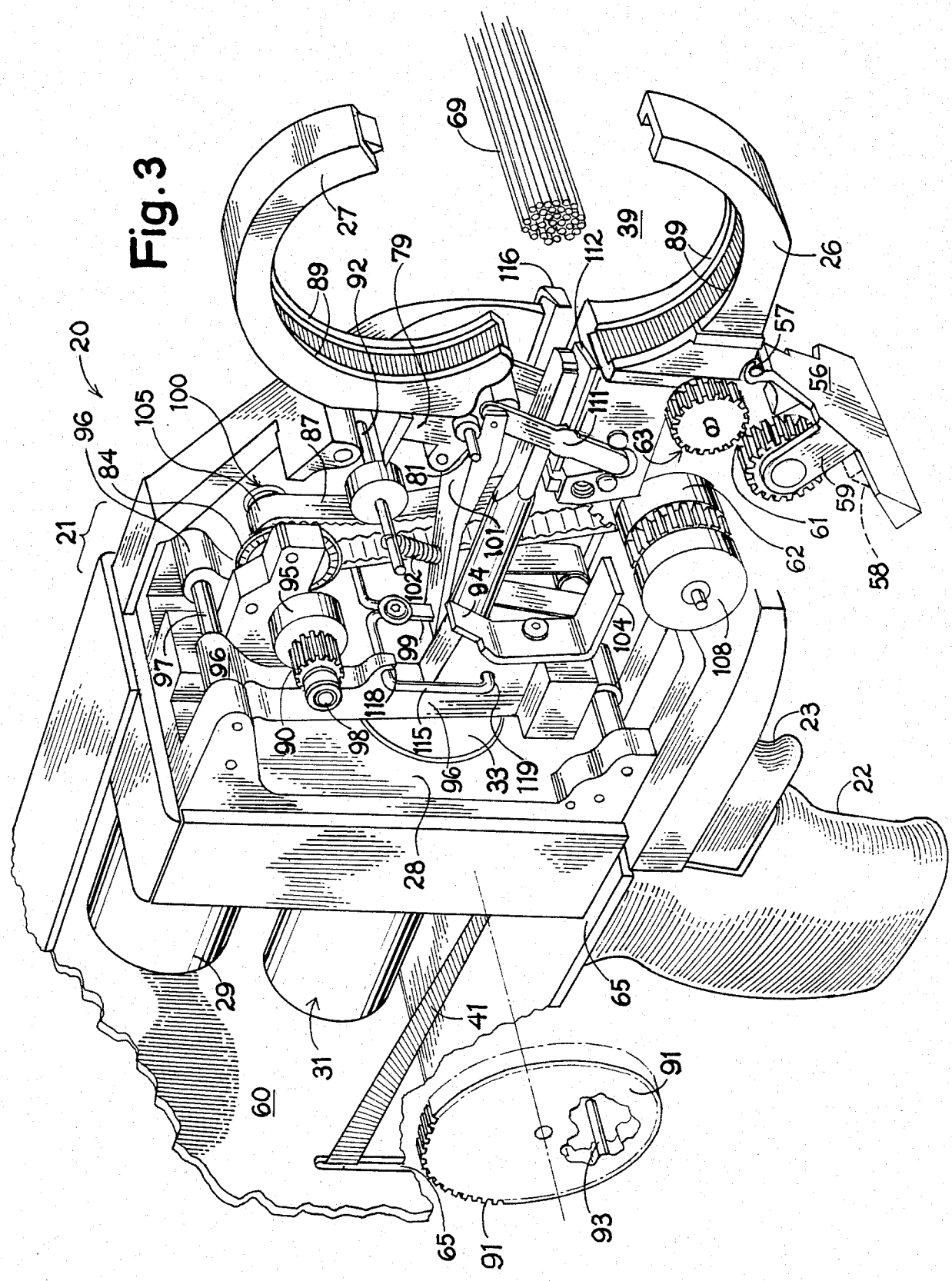
FIG. 3 is a fragmentary, enlarged perspective view of the same forward portion of the device, showing the jaws in their open position, with the nearer tape-clamping anvil, its articulating linkage and the housing removed to expose the remaining parts.
Figure 4:
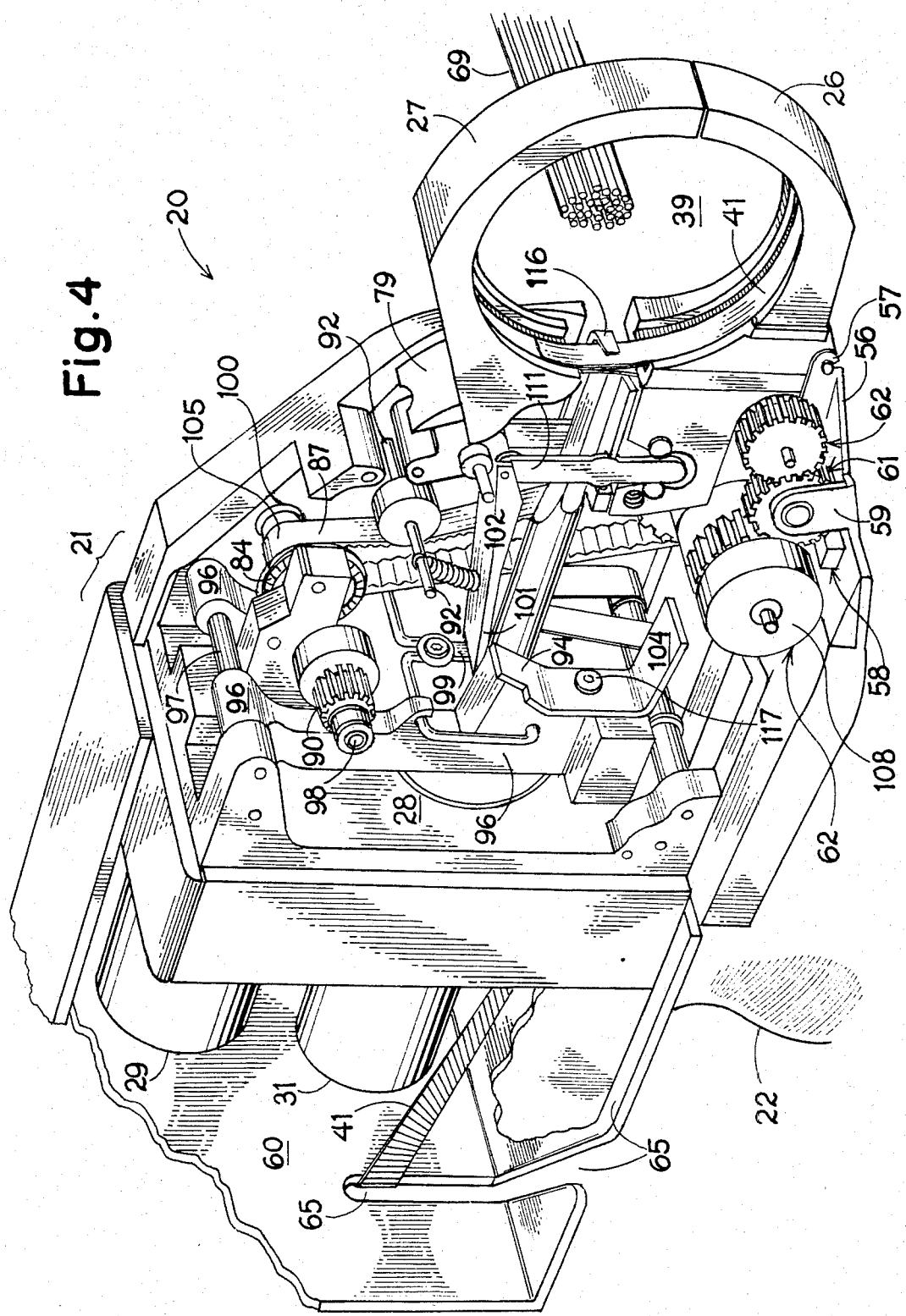
FIG. 4 is a corresponding fragmentary perspective view of the forward end of the device, with similar parts removed, showing the jaws and one of the two tape-clamping anvils in their closed position just following tape advance.

Rollers 62 and 63 are provided with gear teeth engaging the teeth on idler roller 61 when it is inserted between them by the closing of the supporting door 56, as indicated in FIG. 4. When the manual door latch 58 is manually depressed by the user, latch 58 disengages from housing 21, and door 56 is then engaged with the overall tying device housing 21 only by its hook 57 partially embracing a housing stud 64. When latch 58 is released manually, the door 56 is free to pivot downward about stud 64 until hook 57 disengages from the stud, as shown in FIG. 3, thus moving the intermediate idler nip roller 61 downward from between the two rollers 62 and 63, disengaging the idler roller's teeth and tractive rim surface, and exposing the tractive tape-engaging faces of rollers 62 and 63.

Figure 12:
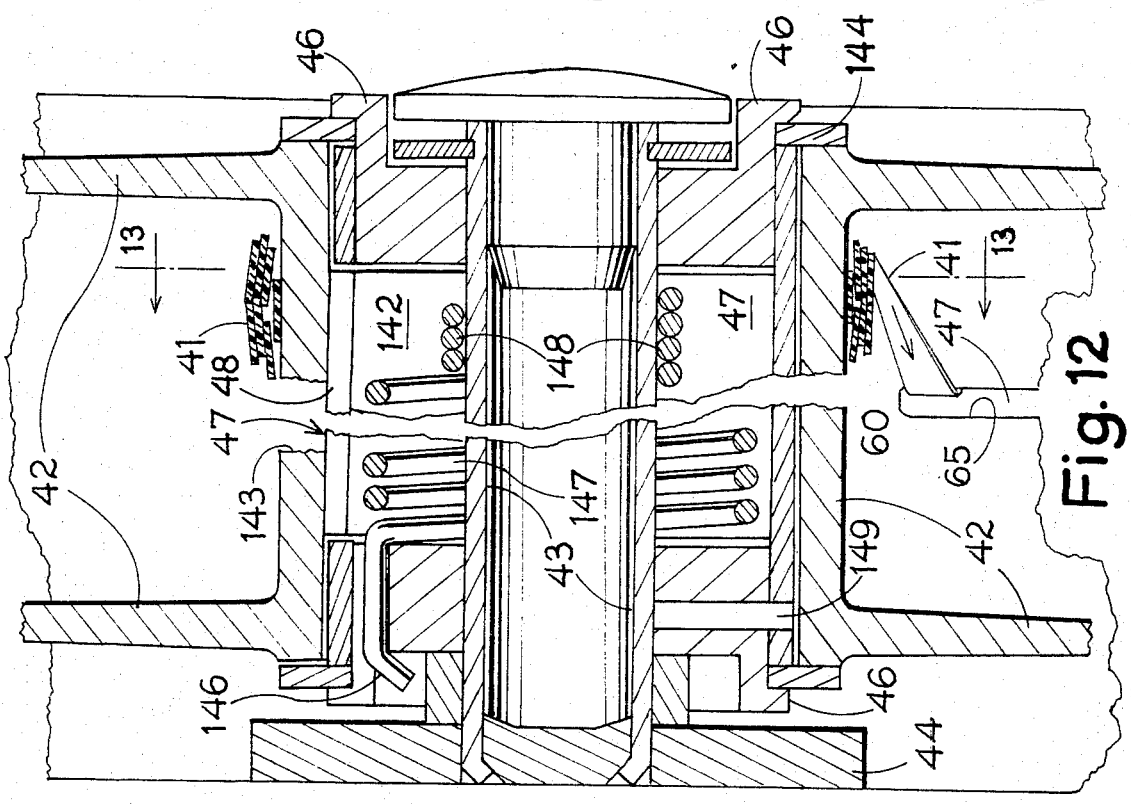
FIG. 12 is an enlarged, broken away, axial cross-sectional view of the tape spool and support mechanism.

As indicated in FIGS. 1, 4 and 12, an elongated slot 65 is formed in the housing 21 extending from the rear end wall 60 of the housing near spool support arm 44 where tape 41 issues from spool 42, across the bottom and along the side face of housing 21 near the upper end of pistol grip 22, across the lower end of the partition wall 28 and down to the vicinity of latch 58 of door 56. As indicated in FIGS. 1—4, handle 22 is rigidly anchored to the base of housing 21 below partition 28, which is formed with a lateral slot 65 (FIG. 3) extending from the near side of the device above handle 22 to the central part of partition wall 28. This slot 65 thus allows tape 41 to be drawn from spool 42 and threaded or inserted sideways into slot 65 over the entire length of the slot from the rear end of the device down to latch 58. When the door 56 is unlatched and swinging by hook 57 from stud 64, it may be unhooked and removed or merely left dangling, as shown in FIG. 3, while the tape 41 is drawn forward and out the door opening to the dash-line position, shown in FIGS. 1 and 2.

The free end of the tape is then inserted upward toward the forward tip of transducer front driver 33 by inserting it endwise between a pair of tape guides, shown in FIG. 2, the rearward guide block 66 and the forward cutter block 67, both anchored in the housing, and defining between their facing surfaces an elongated tape-receiving passage 68 extending upward from the outer forward periphery of the forwardmost nip roller 63 toward the tip ridge 37 of transducer front driver 33.

As door 56 is pivoted upward toward its seated position, with its hook 57 engaging stud 64 and with its latch 58 closed to bring the outer surface of the door into flush engagement with the housing to the position shown in FIGS. 2 and 4, the central idler roller 61 urges the tape ahead of its rim into mutual engagement between rollers 62-61-63.

Once threaded into this loaded position through slot 65 and between the nip rollers 62-61-63 into tape-receiving passage 68, the tape remains threaded through the device during all stages of each successive operating cycle until the entire supply reel of tape wound on spool 42 has been exhausted. This threading and manipulation of the tape therefore need be repeated only once during the loading of each fresh spool of tape. The operator quickly and conveniently threads the tape through slot 65 and the passage 68 and closes door 56, requiring only a few seconds for the entire tape-loading operation.

When the device is thereby made ready for use in wrapping and tying bundles of electrical conductors or similar objects, it may be moved forward by the operator with the open jaws 26 and 27 embracing and encircling the group of electrical conductors 69 in bundle zone 39, as shown in FIG. 3. Rearward force applied by the user's trigger finger moves trigger 23 rearwardly relative to pistol grip 22 and housing 21, to the position shown in FIG. 2, where the trigger latch 71 has moved rearwardly and dropped over the latching flange 72 secured in the pistol grip 22, all as shown in FIG. 1.

This rearward motion of trigger 23 causes clockwise pivoting movement of a double-ended crank 73 whose lower end is engaged with the concave upper portion of trigger 23, as shown in FIG. 2. Being centrally pivoted on a fixed pivot pin 74, the upper end of crank 73 is thus moved clockwise to the right against the resilient urging of a torsion spring 76 encircling fixed pivot pin 74. A pivot pin 75 mounted in the upper end of crank 73 pivotally joins the crank to a diagonally upward extending link 78, whose distal forward end is similarly pivoted by a pivot pin 77 to a jaw carrier 79.

As shown in FIG. 2, jaw carrier 79 provides pivoting support for the movable jaw 27, whose base is firmly anchored to the forward portion of the jaw carrier 79. A central fixed pivot pin 81 provides a pivotal mounting for jaw carrier 79, allowing it to move from the open position, show in FIG. 3, to a closed position, shown in FIGS. 2 and 4, at the urging of link 78, moved forward by trigger 23 via crank 73.

Thus when the movable jaw 27 is open, in the counter-clockwise pivoted position of jaw carrier 79, the actuating pivot pin 77 joining carrier 79 to link 78 is in its rearward dash-line position, shown in FIG. 2, and a lowermost pivot pin 82 in jaw carrier 79 is swung forward to the dash-line position shown in FIG. 2.

Forward Tape Advance

Figure 9:
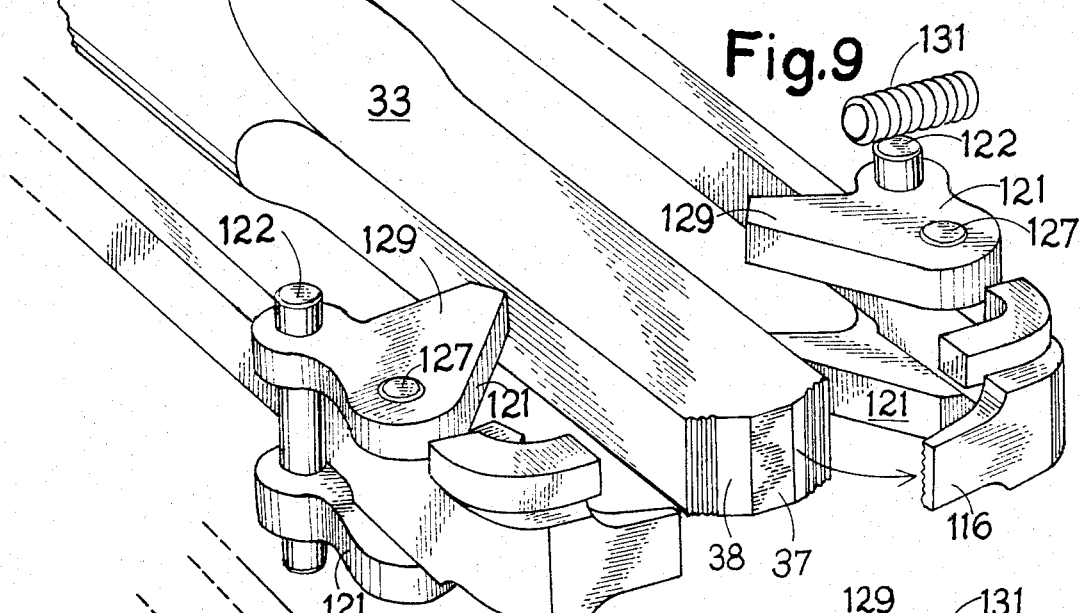
FIG. 9 is a corresponding fragmentary perspective view and shows the anvil blades and their pivoting yokes positioned flanking the transducer tip in their open position.

The trigger-actuated closing of movable jaw 27 into abutting contact with fixed jaw 26 in the position shown in FIG. 2, encircling bundle 69, thus renders the device ready for automatic bundle-wrapping operation. The tape-clamping anvil blades 116 remain open, as shown in FIGS. 7 and 9, during the first stage of the operation, the forward advance of a length of tape sufficient to encircle the bundle. This tape advance is produced by actuation of drive motor 29, turning bevel pinion 83 to drive bevel gear 84 on whose shaft is mounted drive pulley 86, a ridged drive pulley connected by a ridged timing belt 87 to a driven ridged pulley 88 integrally or keyed to driven nip roller 62. This forms a tractive pinch-roll assembly with idler nip roller 61.

Intermeshing gear teeth integrally formed on the idler and driver rollers cooperating with the ridged pulley 88 engaged with the ridged timing belt 87, produce tractive tape movement between nip rolls 61-62 and through a second pair of nip or pinch rolls, the nip rollers 61 and 63 being likewise geared together, thus delivering the tape endwise into tape-receiving passage 68. The mating pairs of nip rolls are preferably formed of resilient rubber or elastomer, for optimum tractive engagement with tape 41. Rotation of motor 29 continues producing this tape advance drive while the free end of the tape 41 travels upward and is guided around the interior surfaces of the movable jaw 27 and the fixed jaw 26 between their lateral flanges 89, forming the inward-facing, channel-shaped cross-section of both jaws. Flanges 89 are clearly illustrated in FIG. 2, where fixed jaw 26 and movable jaw 27 are both shown cut away, and two full turns of tape have guided themselves around the channel-shaped central portion of these two mating jaws 27 and 26 to form a double tape layer encircling bundle 69. The plastic tape 41, normally fiber-reinforced or braided, is relatively stiff, and while sufficiently flexible to embrace the nip-roll pairs 62-61 and 61-63, it extends endwise through tape-receiving passage 68 and guides itself around the channel between flanges 89 in the two jaws 27 and 26 without diverging or escaping from the channel. The tape's stiffness tends to maintain these encircling layers of tape, one lying inside the next, as they are rotated inside the jaws 27 and 26 by the driving force applied by the nip rolls.

When tape 41 has encircled the bundle 69 with the desired number of turns, and the free end of tape 41 has returned to the vicinity of the transducer front driver 33 and formed a new tape layer in front of the transducer tip 37, the device has completed the first stage of its wrapping cycle and is ready for the initiation of the second stage.

Clamping and Tautening the Tape

The control and completion of the first or wrapping stage of the operating cycle of the device is governed by the rotation of a retracting gear 91, shown exploded to its disassembled position in FIG. 3, and normally mounted for rotational movement on shaft 92, which spans the forward portion of the housing 21 and is journalled in each side thereof. Gear 91 is meshed with a drive pinion 90, driven clockwise by a one-way override clutch 95 and counterclockwise by a two-directional slip clutch 98. both mounted on the shaft of the motor driven bevel gear 84. Protruding axially from gear 91 near its rim is a pin 93, and when forward driving torque via clutch 95 is initiated by motor 29, pin 93 begins rotation from the position shown in FIG. 2, directly above and behind a spur 94 protruding diagonally forward and upward from the lower end of a retracting arm 96, which can be seen in FIGS. 2, 3 and 4.

Retracting arm 96 is provided with a forked upper end pivotally mounted on a top shaft 97 journalled in sturdy lugs protruding from the forward face of partition wall 28, as shown in FIGS. 3 and 4, and retracting arm 96 extends downward for pivoting movement between a forward position shown in FIG. 3 and rearward position shown in FIG. 4. The rearward position is shown in solid lines in FIG. 2, where the forward position is shown in dashed lines.

Pin 93 is positioned just to the rear of the upper tip of spur 94 upon closing of the movable jaw 27, and forward rotation of drive motor 29 causes counterclockwise rotation of pinion 90, whose teeth are engaged with those of retracting gear 91, and whose rotation in a clockwise direction moves pin 93 through substantially one complete revolution, as indicated in FIG. 2A, while timing belt 87 is driving the pinch rolls 62-61 and 61-63 to advance the tape as previously described.

When pin 93 has made nearly a complete revolution, from the solid line position all the way around to the dashed line position, shown in FIG. 2A, pin 93 then propels spur 94 rearward or to the left, thus causing retracting arm 96 to pivot a short distance clockwise about top shaft 97 to its solid line position shown in FIG. 2.

When pin 93 first contacts spur 94, as indicated in FIG. 2A, the lower edge of a kicker plate 99 depending from the central portion of retracting arm 96 overlies an elongated kicker strut 101, whose right end is pivotally joined to lower pivot pin 82 carried by the jaw carrier 79, and whose central portion is resiliently urged upward by the action of a helical tension spring 102, whose lower end is engaged with the mid-region of the kicker strut 101, and whose upper end is engaged with shaft 92, as shown in FIGS. 3 and 4. Alternatively, the upper end of spring 102 may be engaged with a transverse shaft 85 journalled in a projection extending forward from partition wall 28, as shown in FIG. 2. Clockwise motion of the retracting arm 96 carrying kicker plate 99 causes the plate to move rearwardly toward and beyond the rear end of kicker strut 101, from the position shown in FIG. 2A to the new position shown in FIG. 2, with the kicker strut 101 being urged upwardly in front of the lower end of kicker plate 99 by the action of helical tension spring 102.

When kicker strut 101 is thus moved upward, with its rear end blocking forward movement of plate 99 and retracting arm 96, a compression coil spring 103 compressed between arm 96 and partition wall 28 is thereby clamped in its compressed condition, placing retracting arm 96 in its "cocked" mode, with spring 103 thereby becoming the source of stored energy ready for later use to complete the operating cycle and sever the wrapped tape.

The clockwise pivoting movement of retracting arm 96 produces two other important consequences. It withdraws the lower end 104 of spur 94 rearwardly, disengaging it from a pivoted pawl 106, mounted for pivoting movement about a fixed pivot pin 107, and the lower beveled end of pawl 106 is positioned for jamming engagement against a drum 108, forming a part of the composite nip roller unit 62 whose gear teeth engage those of the idler nip roller 61 to produce the tape driving traction force. Pawl 106 is urged into this jamming engagement with drum 108 by a torsion spring 109 encircling pivot pin 107.

The beveled end of pawl 106 is positioned to bring its leading edge into tangent contact with the periphery of drum 108 at a point close to the line joining the rotational axis of nip roll 62-drum 108 with the axis of the pivot pin 107 on which pawl 106 is pivotally mounted. For this reason, the torque supplied by torsion spring 109, as well as any further forward rotational movement of drum 108, both have the effect of increasing the jamming force applied by pawl 106 against drum 108 to stop further forward nip-roll movement feeding tape 41.

Thus, one full revolution of retracting gear 91 determines the length of tape fed into jaws 26 and 27. The length of tape fed during one feeding cycle may thus be changed by adjusting the ratio of the pitch diameters of pinion 80 and ridged drive pulley 86, making a corresponding change in the pitch diameters of gear 91 and its pinion 90.

It will be noted that the closing movement of jaw carrier 79, pivoting clockwise about its stationary pivot pin 81, which produced the closing movement of movable jaw 27 to the position shown in FIGS. 2 and 4, also moves kicker strut 101 rearwardly to its armed position, shown in FIG. 2A. This is because the pivot pin 82 on jaw carrier 79 has been carried clockwise and rearwardly, which in addition causes the cutter actuating lever 111 to move from the forward-leaning position, shown in FIG. 3, to the rearward leaning, cutter-retracted position, shown in FIGS. 2 and 4.

Figure 8:
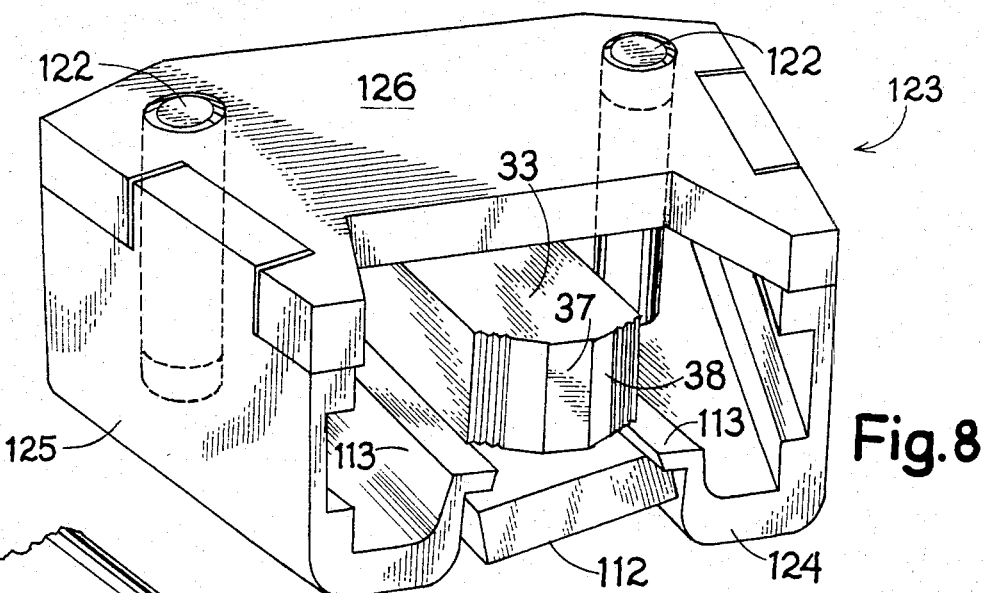
FIG. 8 is a greatly enlarged fragmentary perspective view of the module installed around the transducer tip to mount the anvil blades in their pivoting yokes.

The sliding cutter blade 112 is mounted between blade guides 113 on an underlying yoke plate 124, and cutter blade 112 is free to move from its forward cutting position, shown in FIGS. 7 and 8, rearwardly to its retracted position, withdrawn beneath and behind the tip ridge 37 of transducer front driver 33, as clearly shown in FIGS. 5 and 6. This movement of cutter blade 112 is produced by the cutter actuating lever 111 moving between its two positions, as clearly shown in FIGS. 3, 4, 5 and 7. Thus when the kicker strut 101 is moved into its rearward position as movable jaw 27 is closed, the cutter blade 112 is always retracted and cannot impede the feeding movement of the tape past tip ridge 37 of the transducer.

Clamping Anvils

Figure 10:
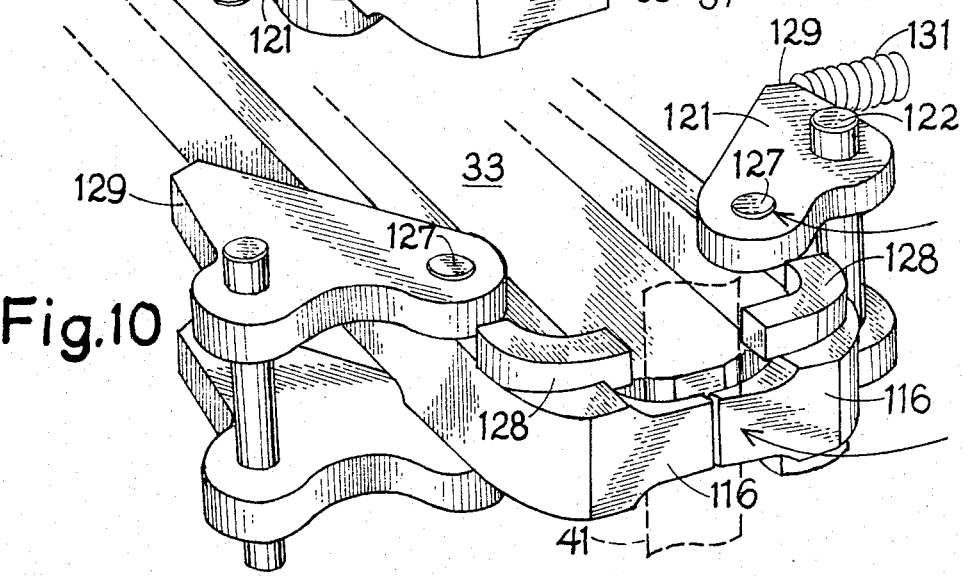
FIG. 10 shows the same anvil blades and yokes moved to their closed position clamping the tape against the transducer tip.

The rearward pivoting movement of retracting arm 96 also performs an additional operation—it draws the anvils 114–116 rearwardly with the anvil blades or tips 116 pivoting inward to become closely juxtaposed to the tip ridge 37 of transducer 33, sandwiching the layers of tape 41 between the transducer tip 37 and the anvil tip 116, as shown in FIGS. 6 and 10.

It should be noted that the rear tape-engaging surfaces of anvil tips 116 are provided with transverse grooves providing traction, holding the innermost tape layer against sliding during the tape tightening operation. By contrast, at least the side edges of the transducer front driver 33 flanking the tip ridge 37 are provided with vertical ridges enhancing the sliding motion of the tape during the tape tightening operation, and also improving the ultrasonic welding action of the transducer when it is energized to bond the tape layers together in a position in which they are sandwiched between the transducer tip ridge 37 and the pair of anvil tips 116 swung into their rearwardmost closed position, shown in FIGS. 5, 6 and 10.

The linkage employed to move the anvils 114 between their two positions is illustrated in FIGS. 5 through 10, where it will be seen that the rear end of each of the elongated bars forming anvils 114 is provided with a transverse through aperture 120. Bolted to the forward face of retracting arm 96 are two bent wire springs 115 formed in the shape of two block letter C's face-to-face, with their upper ends held by the bolt 117.

These springs 115 extend from the central bolt upward and outward toward each side of arm 96, passing behind a downwardly extending hook 118 and thence downward along the outer face of arm 96 on each side to turn inward and pass through an enlarged aperture 119, extending through both sides of the arm 96 directly flanking the transducer front driver 33. The free ends of springs 115 protrude inward from the inner ends of apertures 119 toward the transducer front driver 33 into engagement with loosely fitting apertures 120 formed in the rear ends of the elongated bar anvils 114.

Thus when the arm 96 is swung forward to the open position, shown in FIG. 7, the anvils 114 are urged forwardly. When the arm 96 swings rearwardly to the closed position, shown in FIGS. 2 and 4, the anvils 114 are likewise drawn rearwardly to the closed position, shown in FIGS. 5 and 6.

Articulation of the anvil tips 116 is provided by a pair of yokes 121 having a generally triangular configuration. Each yoke 121 is pivotally mounted on a fixed pivot pin 122 for pivotal movement in the transverse plane perpendicular to the direction the tape is fed past the transducer tip. Fixed pins 122 may be anchored directly in the housing 21 if desired. However, as shown in FIG. 8, each fixed pin 122 is preferably part of an anvil-guiding module 123 formed by a yoke plate 124 underlying the transducer front driver 33 and the anvils 114, and having upstanding sides 125 bridged by an overlying tie plate 126.

Pivot pins 122 are fitted with their ends secured in the yoke plate 124 and the tie plate 126, and their central portions, standing like architectural columns flanking the transducer front driver tip 33, are thus secured in position to provide pivotal mountings for the yokes 121. Each of the triangular yokes 121 is provided with a pivot aperture accommodating a pivot stud 127 protruding in a vertical direction from the upper and lower forward end of one of the bar-shaped anvils 114. This engagement is shown in FIGS. 5, 7, 9 and 10.

The pivoting yokes 121 are mounted to swing from a forward unclamped position, where studs 127 are positioned forward and slightly inward of the fixed pivot pins 122, when retracting arm 96 is in its forward position, with anvil tips 116 extended forward and outward, well clear of the wrapping tape bonding zone, to a rearward clamping position where studs 127 on anvils 114 are swung inwardly to positions closely flanking transducer front driver tip 33, when the retracting arm 96 is in its rearward position, shown in FIG. 5, thus moving the anvil tips 116 together and rearwardly to positions in close proximity to the tip ridge 37 of the transducer, where they hold the turns of tape in clamping engagement between the transducer tip and the anvil tips 116. It should be noted that anvil tips 116 are provided with a pair of upstanding tape guides 128 protruding above and rearwardly from each anvil tip to flank the tape zone between transducer tip 37 and anvil tips 116 where the turns of tape are clamped, as clearly shown in FIGS. 5, 6 and 10.

Thus, as shown in FIG. 6, the anvil tips and the transducer tip form between themselves a slightly V-raked laterally elongated opening within which the turns of tape are clamped by anvil tips 116. However, because of the vertical ridges flanking transducer tip 37, the outer turns of tape 41 are free for vertical sliding movement relative to the innermost layer of tape 41 caught in the transversely grooved anvil tips 116.

Each of the yokes 121 is provided with a protruding stop 129 which pivots out to a lateral position substantially aligned with the fixed pivots 122 as the anvil tips 116 swing inward into close clamping juxtaposition with the transducer tip ridge 37. In these outermost positions of the stops 129, they come into abutting engagement with set screws 131, shown in FIGS. 5, 7, 9 and 10, permanently mounted in housing 21. One yoke 121 on each side of the transducer tip may be provided with a set screw 131, or if desired, both yokes 121 on each side may be provided with individual set screws. Adjustment of the set screws 131 limits the inward movement of anvil tips 116 toward the transducer tip ridge 37, thus precisely limiting the minimum gap width and thus the minimum tape thickness where the ultrasonic weld melts and bonds the tape layers together when they are clamped between anvil tips 116 and tape ridge 37, as shown in FIG. 6.

As shown in FIG. 7, a pair of diagonal anchoring screws 132 mounted at the forward end of the housing 21 bear against angled sockets formed in the rear lateral edges of yoke plate 124, providing finely balanced positioning of the module 123-124-126, shown in FIG. 8, for precise alignment with the tip of the transducer which it embraces.

Figure 11:
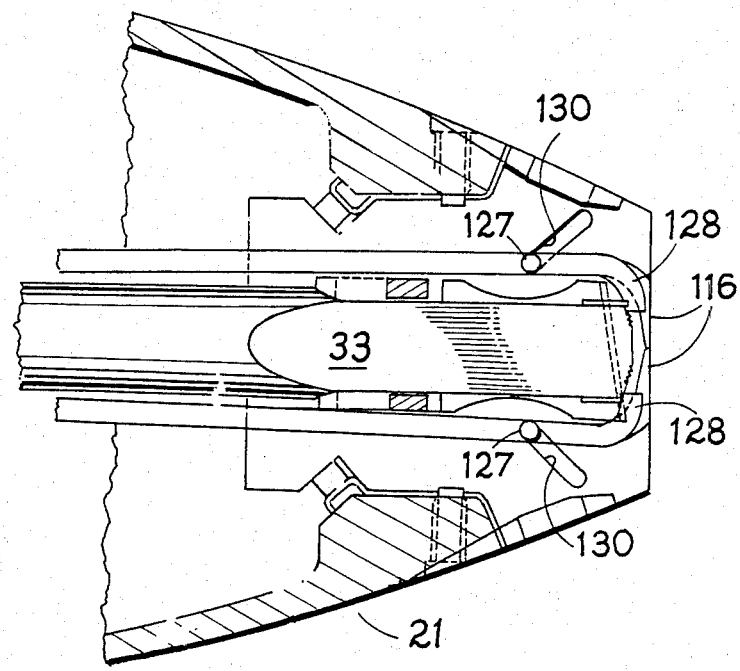
FIGS. 11 and 11A are enlarged top plan cross-sectional views, respectively corresponding to FIGS. 5 and 7, showing an alternative anvil guiding slot structure for camming the anvil blades between their clamped and their unclamped positions.
Figure 11A:
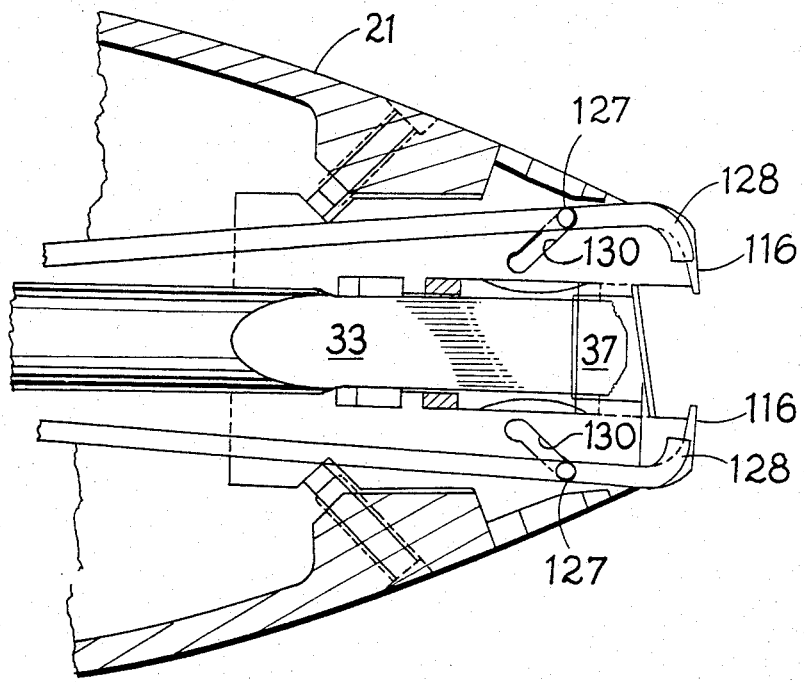

An alternative anvil-articulating guide device, having no pivoting yokes 121, is shown in FIGS. 11 and 11A. Studs 127 extending from the upper and lower forward ends of each anvil 114, behind its clamping tip 116 are slidingly engaged in diverging camming slots 130 formed in housing 21, or in the yoke plate 124 and tie plate 126 forming the anvil guiding module 123. When anvils 114 are moved forward by retracting arm 96, unclamping their tips 116, their studs 127 cam them divergingly outward along slots 130, as shown in FIG. 11A. When anvils 114 are moved rearwardly, studs 127 slide convergingly rearward (FIG. 11), clamping tips 116 against tape 41 (FIG. 6).

Tautening of the Tape To Wrap the Bundle Tightly

Rearward movement of retracting arm 96 is impelled by pin 93 on retracting gear 91 engaging spur 94 on arm 96, as shown in FIG. 2A, and movement of arm 96 to its rearmost position, shown in FIG. 2, not only compresses the helical compression spring 103 sandwiched between retracting arm 96 and partition wall 28, but also trips limit switches 30 which initiate rotation of motor 29 in its reverse direction. Reversing torque is thus applied by bevel pinion 83 and bevel gear 84 to move timing belt 87 in its reverse direction to cause reverse rotation of the nip-roll pairs 61-62 and 61-63. The shaft of bevel gear 84 delivers torque through a slip clutch 100 to drive the ridged pulley 86 engaging the timing belt 87 in the forward, tape-feeding direction, and an overrunning one-way clutch 105 drives the same ridged pulley in the reverse direction, to draw the tape tightly around the bundle 69.

Reverse rotation of bevel gear 84 also turns pinion 90 and gear 91 via a slip clutch 98, returning the pin 93 a short distance counterclockwise to its home position seated against spur 94, ready for its next forward cycle, and slip clutch 98 then slips to leave pin 93 against spur 94.

Reverse rotation of drum 108 serves to disengage pawl 106, and drum 108 slips past the beveled end surface of pawl 106 so long as it is rotating in this reverse direction. The effect of reverse nip-roll rotation is to draw the outermost layer of tape 41 forming the outermost complete tape band around the wrapping zone 39 downwardly and rearwardly toward spool 42, and this has the effect of drawing all layers of tape 41 into closer engagement with the bundle 69 about which they are wrapping until the bundle is tightly wrapped and drawn close to the tip of the transducer.

As in FIG. 6, the thin beveled anvil tips 116 clamping the layers of the tape to the transducer tip occupy an extremely small volume in the overall space subtended by the bundle of wire conductors 69 to be wrapped by the turns of tape.

The reverse rotation of the nip roll pairs 61-62 and 61-63, geared together and driven by reverse motor torque delivered to the nip rolls by the timing belt 87, tractively draws the outermost turn of tape downward, as viewed in FIG. 2, through the tape-receiving passage 68, progressively reducing the diameter of all turns of tape circling bundle 69. One-way clutch 105 delivers driving torque to belt 87 during this reverse, tape-tautening operation. Slip clutch 100 partially counteracts the overrunning action of one-way clutch 105, thus driving the ridged belt 87 in the forward mode to feed tape 41 during the initial tape-wrapping phase of the operating cycle.

The outermost turn of tape being drawn downward into the tape-receiving passage 68 easily slides downward past the vertical ridges flanking the tip ridge 37 of the transducer, as shown in FIG. 9. The outer layers of tape slide easily past each other and past grooved ridge 37 at the transducer tip, and these overlapping turns of tape sliding over each other during the tape-tautening operation are guided in substantial alignment by the upstanding tape side guides 128 flanking the turns of tape, as shown in FIGS. 6 and 10.

Optional Swinging Tape Guide Mechanism

Figure 14:
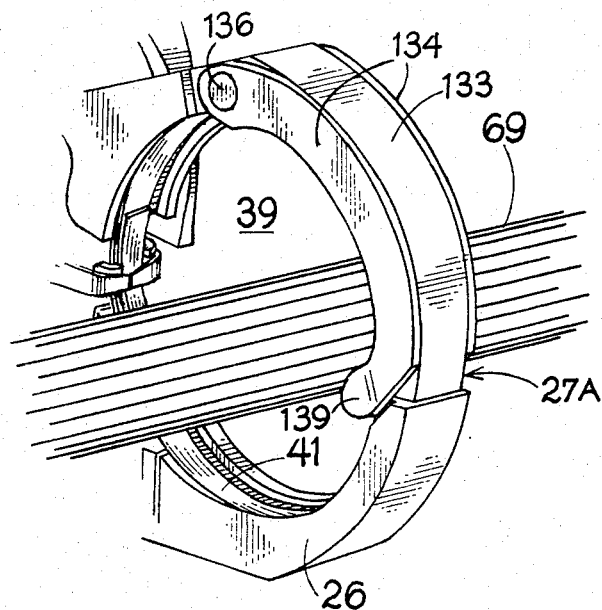
FIGS. 14, 14A, 14B and 14C are enlarged fragmentary front perspective views, showing a modified movable jaw in successive stages of its tape-guiding operation.
Figure 15:
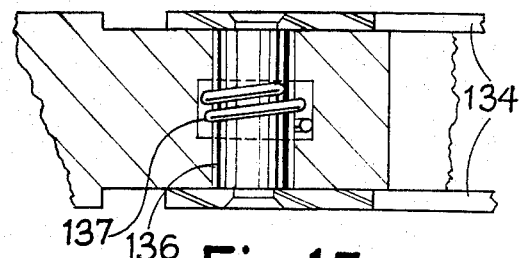
FIGS. 15 and 16 are corresponding enlarged cross-sectional plan views of different parts of the movable jaw of FIG. 14, showing the movable jaw's flange pivot and the flange tips pivoted toward the anvils respectively.

Shown in FIGS. 14, 14A, 14B, 14C, 15 and 16 is an optional movable jaw 27A having a fixed jaw portion 133 and a pivoting double flange portion 134. The fixed jaw portion 133 of movable jaw 27A is anchored to the jaw carrier 29 in the same manner that the unitary movable jaw 27 is anchored. Partway along the periphery of the movable jaw 27A, a transverse pivot pin 136 is mounted, as shown in FIG. 15, and this provides a pivoting support mounting for pivoting double flange portion 134. Encircling the pivot pin 136 is a torsion spring 137. Preferably the pivot pin is riveted inside the flanges of the pivoting double flange portion 134, and is thus integral with portion 134. One end of torsion spring 137 forms a leg bearing against the side of a U-shaped aperture formed in the fixed jaw portion 133, while the other end of torsion spring 137 is bent to engage a transverse bore in the pivot pin 136. By this means, spring 137 gently urges the pivoting double flange portion 134 outward to its normal "stowed" position, as shown in FIG. 14, where the slightly converging outer ends 138 of the side flanges extend radially inward a short distance from the abutting ends of jaws 26 and 133.

Figure 14A:
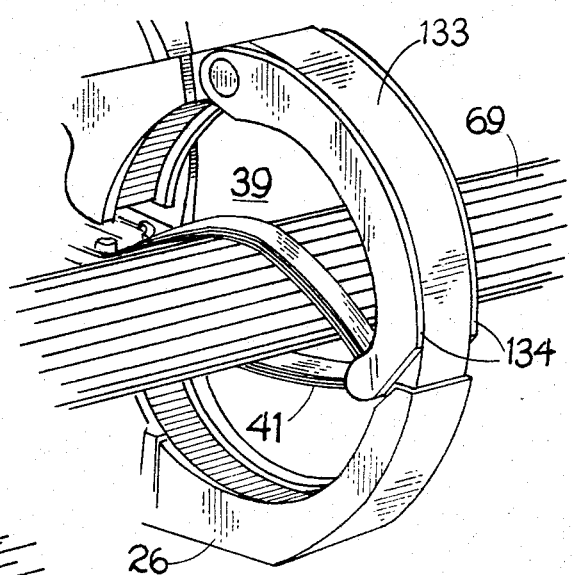
Figure 14B:
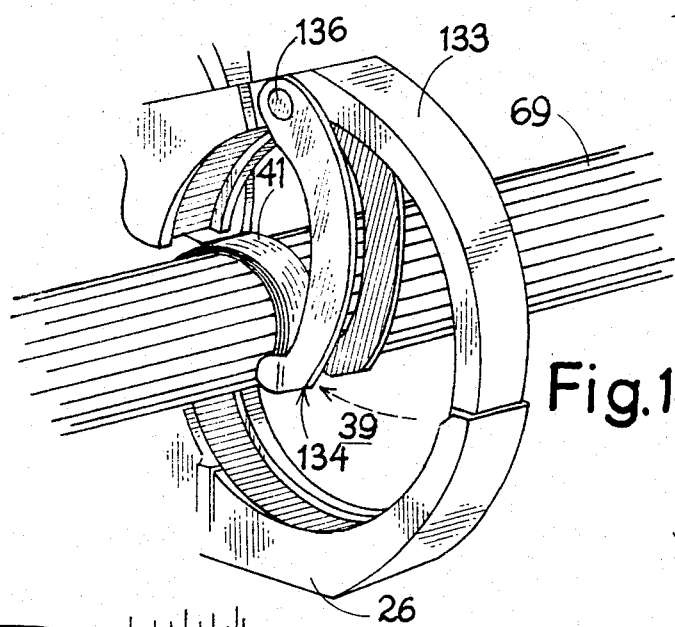

These converging outer ends 138 of the dual pivoting guide flanges 134 thus extend slightly inward and toward each other at 139 to produce a camming flange zone at the far side of the jaws opposite the transducer tip. During the tape tautening operation previously described, when the turns of tape 41 are tending to draw inward and reduce their diameter, as shown in FIGS. 14A and 14B, these turns of tape engage the slightly converging flanges 139 on outer end 138 of pivoting flange portion 134, causing portion 134 to swing inward toward the transducer about its pivot pin 136 to the position shown in FIG. 14B.

Figure 16:
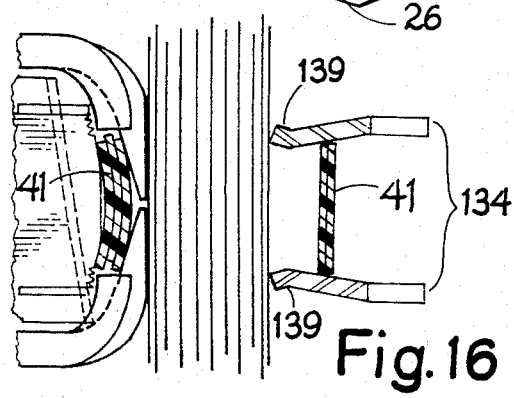
Figure 14C:
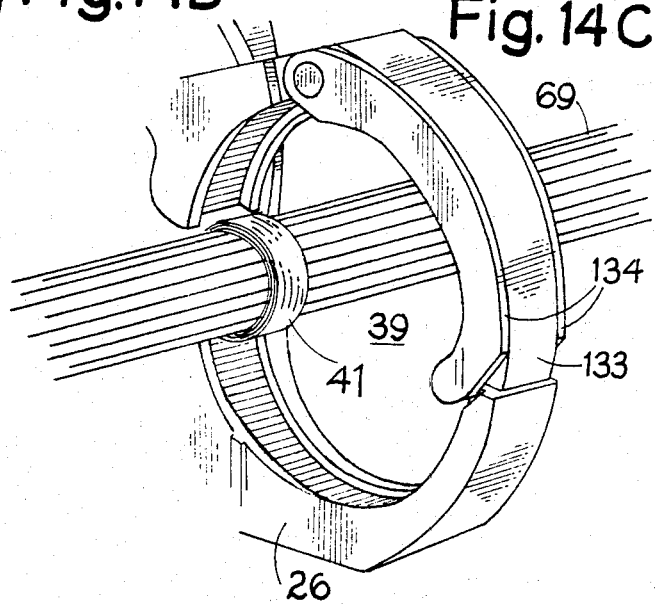

The edges of the turns of tape engaging the converging flanges 139 overcome the very light torque applied by torsion spring 137 to produce this swinging motion until the edges of the converging flanges 139 reach and are stopped by the bundled conductors 69 being wrapped by the tape. At this time, as indicated in FIG. 16, the tape easily draws itself between and through the converging flanges 139, which thus release the pivoting flange portion 134 for re-deployment to its stowed position by the operation of the torsion spring 137. During its swinging pivoting motion about pin 136, pivoting flange portion 134 has thus retained the overlapping turns of tape with their edges aligned in the same manner that their edges are aligned by the upstanding tape side guides 128 on anvil tips 116. By this means the overlapping layers of tape have their edges aligned both at the transducer and at the opposite side of the bundle, thus tending to keep them fully aligned during the tape tautening operation.

When the reverse driving torque applied by motor 29 via one-way clutch 105 takes up all available slack in tape 41 and the bundle is tightly wrapped, clutch 100 slips. Reverse motor actuating electrical power may be cut off in response to increased current caused by stalling of the motor shaft. In one preferred embodiment, the light reflective faces of a hex clutch nut 141 reflect light to a photosensor 142 connected to a pulse counter, and the zero pulse rate due to the slipping clutch is sensed to cut off operating power, terminating the tape-tautening operation.

Pawl 106 automatically jams drum 108 against forward rotation, holding the tape taut and the tightly wrapped bundle is then ready for tape severing.

Tape-Rewinding Spool-Hub Assembly

Figure 13:
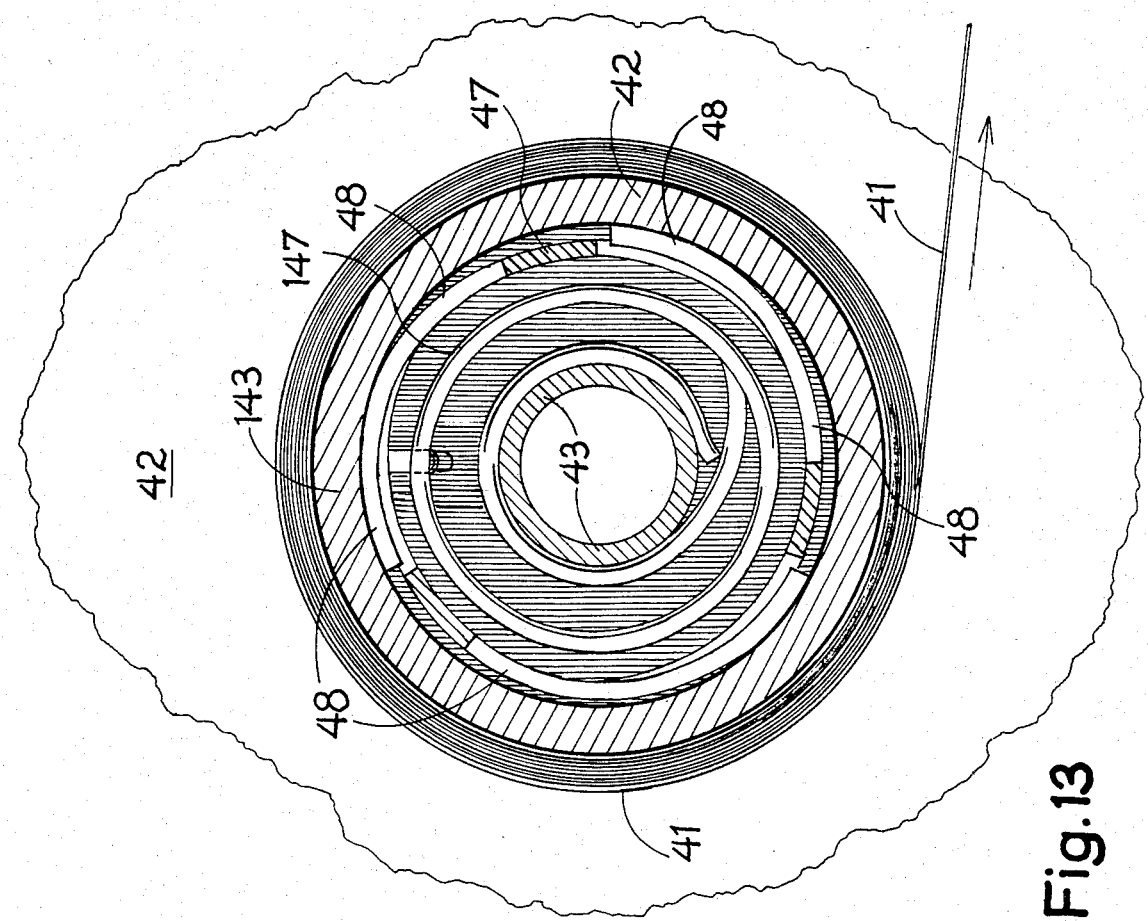
FIG. 13 is a corresponding transverse cross-sectional view of the same spool and support mechanism.

The hub assembly supporting the tape storage spool 42, illustrated in FIGS. 1, 12 and 13, where it is shown to be mounted on rearwardly protruding support arm 44 extending from the rear end wall 60 of housing 21 at the left side in the rear end view shown.

The two spool bearing discs 46 mounted at opposite ends of hub spindle 43 provide support for the central bore of the tapered, conical spool drum 47 inside the opposite ends of which the discs are respectively telescoped. The central peripheral wall of spool drum 47 is formed into a plurality of gently outward-spiraling vanes 48 having a substantially rectangular outline in unrolled projection, with one longitudinal side being integrally joined to the remainder of spool hub 47 with the two ends and the opposite peripheral side of each rectangle being severed from the body of spool drum 47, leaving each entire vane 48 to be spirally radially offset outward, with its full longitudinal edge protruding radially outward a short distance, beyond the normal circumference of the spool drum 47. Its protruding vane edges are resiliently depressible, and this spiral vaned spool drum is normally fabricated from steel giving the vanes the resilient stiffness of leaf springs.

As indicated in FIG. 13, spool drum 47 may be provided with three such spirally extending vanes 48. As there shown, the protruding edges of vanes 48 provide the internal support for the tape-carrying reel or spool 42, which is provided with a hollow hub 143, telescopingly embracing the body of spool drum 47 and held thereon by a removable C-ring 144, fitting behind radial flanges on the righthand spool bearing disc 46 remote from spool support arm 44. Hub 143 of the tape spool 42 may slide on the peripheral edges of spiral vanes 48 in response to torque applied to the spool 42.

A torsion spring 147 has one end anchored indirectly to spool drum 47, and the other end clutched to hub spindle 43.

The left spool-bearing disc 46 is provided with a hole or a radial slot extending part way inward from its periphery, in which is seated a longitudinal extension 146 of the helical torsion spring 147 having a plurality of turns with a diameter less than the internal diameter of vanes 48, but substantially greater than the external diameter of hub spindle 43, which it encircles within the chamber formed between the spirally extending vanes 48 of spool drum 47 and the central hub spindle 43. The end of spring 147 opposite to its longitudinal extension 146 is formed as a similar helical torsion spring of reduced diameter, provided with a number of turns 148 whose relaxed internal diameter is slightly smaller than the external diameter of hub spindle 43, providing a clutching grip thereon.

The dimensions of bearing discs 46 and spool hub 47 are chosen to provide a tight or interfering fit between these parts, which therefore normally rotate together, and this unitary construction may be assured by a radial pin 149, shown in the left central portion of FIG. 12, keying spool drum 47 to the left bearing disc 46 in which spring extension 146 is engaged. Bearing discs 46 however are preferably free to rotate the fixed hub spindle 43, and spool 42 may rotate on vanes 48.

The overall assembly provides a tape retracting dispenser which delivers the desired lengths of tape to the nip rollers as required, and automatically retracts the extra tape delivered in reverse by the nip rollers during their tape-tautening mode of operation. Tape rewinding is achieved by the action of torsion spring 147, which is "wound up" as tape 41 is drawn into the nip rollers in their feeding mode. In the view of FIG. 13, this normal tape-feeding movement of tape 41 produces counterclockwise rotation of spool 42, which is transmitted by the spiral vanes 48 via the radial slot in the left bearing disc 46 to wind up the larger turns of spring 147, correspondingly tending to wind up and reduce the diameter of the smaller turns 148 which thereby more firmly clamp the stationary central hub spindle 43. When the frictional traction force between the protruding edges of vane 48 and the interior surface of hub 143 of spool 42 produced by tape withdrawal exceeds the force needed to overcome static friction, hub 143 will begin sliding counterclockwise around vanes 48. Until this static friction limit is reached however, the counterclockwise tape-dispensing rotation of spool 42 serves only to wind up helical spring 147, storing torsional energy therein.

When anvils 116 close and retracting arm 96 swings back to reverse the mode of operation, the reverse rotation of the nip rolls tautening the tape around bundle 69 releases the tension in tape 41 and allows the torsional energy stored in spring 147 to cause reverse rotation of spool 42, assuring that all slack tape released by the reverse nip roll operation is again stored on spool 42, ready to be dispensed for the next tape feeding operation. Accordingly, this tape-rewinding spool assembly avoids slack or tangled tape and assures smooth tape dispensing and rewinding operation in both directions during each operating cycle of the device.

Tape Welding

Completion of the tape-tautening reverse motor and pinch roll operation causes clutch 141 to stop rotating. This event, either by the cessation of pulses from photosensor 142 or by the increase in current through the stalled motor, automatically signals that the taut tape-wrapped bundle is ready for tape welding. A brief burst of energy supplied via terminal 35 to transducer crystals 34 produces the ultrasonic welding energy vibrating tip 37 and actually melting the tape sandwiched between tip 37 and anvils 116. After a brief cooling period, the timing circuitry of the device automatically energizes the solenoid 151, preferably mounted in the handle 22, moving its armature 152 to disengage the trigger latch 71 from its latching flange 72. Trigger latch 71 is preferably formed as a stamped sheet metal part embedded in the upper portion of the trigger 23, as indicated in FIGS. 1 and 2, while trigger latching flange 72 is preferably formed as a Z-shaped stamped sheet metal part, anchored in the upper end of handle 22 with one of its flanges positioned for latching engagement with trigger latch 71 in the rearward depressed position of trigger 23.

When retracting arm 96 is in its "cocked" mode, compressing spring 103, it applies a forward pressure to kicker strut 101, which in turn applies a counterclockwise moment to jaw carrier 79, which, through actuating link 78, applies a counterclockwise moment to trigger crank 73.

Displacement of trigger latch 71 by armature 152 easily disengages the trigger latch 71, and trigger crank spring 76 together with spring 103 is thereupon free to urge trigger crank 73 in a counterclockwise direction, returning trigger 23 to its forward dash line position shown in FIG. 2, and at the same time actuating link 78 to rotate jaw carrier 79 to its counterclockwise position shown in FIG. 3.

This opens the jaw 27, simultaneously actuating cutter 112 severing the outer layer of tape, shearing against cutter block 67 while leaving the wrapped tape layers intact, and the counterclockwise movement of retracting arm 96, being pushed by spring 103, forces kicker strut 101 endwise forward to the right, as viewed in FIGS. 2 and 2A. Spring 103 urges retracting arm 96 counterclockwise as its kicker plate 99 forces kicker strut 101 to the right. A protruding cam bump 153 forming a stamped offset above the upper surface of kicker strut 101, as shown in FIG. 2B, is thereby brought into engagement with a camming stud 154 fixedly mounted in the housing 21, and the forward movement of kicker strut 101 thus produces its downward camming deflection, stretching its biasing spring 102 and lowering the rear end of kicker strut 101 below the end of kicker plate 99 on retracting arm 96.

This releases retracting arm 96 to assume its forwardmost position where its kicker plate 99 overlies the rear end of kicker strut 101, as indicated in FIG. 2A, and leaves the device in condition for the next bundle-wrapping operation, in which the kicker strut 101 may move rearward without engaging the kicker plate 99 on retracting arm 96. The forward movement of retracting arm 96 has meanwhile moved the anvils 116 to their outward retracted position illustrated in FIGS. 7 and 9, simultaneously withdrawing the tips of anvils 116 from under the tape binding the wrapped bundle and releasing the bundle with its wrapping from the device entirely.

Wrapping Abort System

To provide automatic protection against undersized bundles, containing two few wires to be wrapped tightly, a wrapping abort system is incorporated in the control circuitry 156, installed in the rear end of housing 21 and governing the operation of motor 29 in response to the actuation of micro switches 30 by the counterclockwise rearward movement of retracting arm 96, and by the operation of trigger 23, which automatically actuates the tape-feed control switches 155 mounted at the upper end of pistol grip 22, just beneath the main housing 21, as illustrated in FIG. 1.

Wiring connections between these various components are omitted for the sake of simplicity in the figures, as are a number of the mechanical linkage parts, such as the nearer anvil 116 and its actuating mechanism, in FIGS. 3 and 4, for example. When the control circuitry counts the motor revolutions required in the reverse operating mode to draw the tape tightly around the bundle 69, it responds to a predetermined preset limit selected to match the minimum bundle diameter desired, and aborts the wrapping and bonding operation if that limit is exceeded, because of the presence of an undersized bundle of conductors or similar elongated articles to be wrapped. In the abort condition, solenoid 151 is actuated and its armature 152 releases trigger 23, opening the jaws without welding the tape, thus disabling the device to inform the operator that an undersized bundle has been presented for wrapping. A red warning light 157 on the rear end of housing 21 may also be illuminated to indicate the presence of an undersized bundle in this condition.

Conclusion

The foregoing components illustrated in the accompanying drawings thus cooperate to produce a novel, lightweight, portable tool for tying electric wires or any comparable elongated objects into neat bundles or harnesses or coils. Rods, tubes, strips, moldings, extrusions, plant stems, vines, branches or any comparable elongated objects can thus be bundled, and tags or labels can be quickly secured by closed loops to garments or other products by this tool.

Closed loops for garments may also be made by using an extruded plastic tape or a stiff strand or cord which can penetrate the fabric of the garment, and the electronic sequence is then re-arranged to perform the weld at any predetermined size of loop.

By utilizing different sizes of interchangeable jaws 26 and 27, the same unit can tie bundle sizes from 6" in diameter, ranging downward to extremely small bundles. The weld abort feature permits the operator or the set-up personnel to select the minimum diameter bundle to be wrapped by the device, avoiding small bundles of 3/16" in diameter or less, for example, which may not meet tightness specifications. When the weld-abort system operates, the operator notes the absence of the audible ultrasonic hum, the red glow of the LED lamp 157 mounted on the rear face of the unit and the visible presence of the unwelded tape tie hanging on the bundle, which has been ejected from the device by the jaws opening in preparation for the next operating cycle.

The device weighs no more than three pounds in the preferred embodiment. The timing and switching control circuits and the ultrasonic transducer drive circuit are all enclosed inside the housing, leaving only a light power cable extending from the pistol grip to the power supply.

Installation of interchangeable jaws and cooperating tape cutters adapt the unit for tape widths ranging from $\frac{1}{8}$" to $\frac{1}{4}$" for the preferred size of the device. Larger or smaller tape widths can also be accommodated in special size devices.

The operating cycle for the device when wrapping one and one-half inch diameter bundles, for example, takes only about one second. Larger bundles may be wrapped in two seconds or less. The automatic tape-tensioning rewinding spool mechanism avoids spills and tangles of tape, and tape tension is maintained throughout all operating cycles, both during tape forward feed and during reverse tape tautening drive modes of the device. The removable tape spool may carry approximately 300 feet of tape which will serve to complete approximately 1,000 wrapping cycles, and a new spool can be loaded in the unit in seconds. Tape contacting and clamping parts, such as the jaws, the cutter blade and tape-clamping anvils, are quickly and easily replaced. The unit successfully handles Nomex or Dacron braided tapes which may be glass impregnated if desired. Extruded tape with or without reinforcing fibers may also be used. Ample weld strength and wrap tightness are produced in all normal operations of the device, with excellent wrap quality.

Safety features such as double insulation and power shutdown when not in use are preferably incorporated in the device, and one of the signal lamps 157 may be a green ready light to signal the readiness of the unit for the next operating cycle if desired.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. An automatic bundle-tying tool for wrapping flexible plastic tape around a bundle of wires or similar elongated objects, drawing the tape taut to compress the bundle, bonding the overlapped tape and then severing the bonded tape to release the wrapped bundle, comprising
    A. a housing having a hollow central enclosure, and a movable actuator resiliently depressible from a forward position to a depressed latched position,
    B. a tape-guiding fixed jaw protruding from the forward end of the housing,
    C. a tape-guiding movable jaw pivoted at the forward end of the housing for movement between an open position spaced away from the fixed jaw and a closed position abutting the fixed jaw in which means forming inward-facing, tape-guiding grooves in both jaws are aligned to encircle a bundle-tying zone,
    D. a resiliently biased tape-rewinding tape storage spool rotatably mounted on the rear of the housing,
    E. an arming linkage inside the hollow housing operatively connecting the actuator to close the movable jaw when the actuator is depressed to its latched position,
    F. drive means in the housing having a forward mode tractively drawing flexible plastic tape from the tape storage spool and feeding it endwise via the tape-guiding grooves to encircle the tying zone with at least one layer of tape whose leading end is thence returned to overlap itself in a tape bonding zone, and a reverse mode retracting the tape to draw the tape around the bundle,
    G. an ultrasonic transducer anchored in the housing and having a bonding tip protruding into the bonding zone,
    H. a tape cutter mounted near the bonding tip for movement between a forward position protruding into the bonding zone and a rearward retracted position,
    I. a pair of tape-clamping anvil blades having thin beveled tips flanking the transducer's bonding tip and movable between an unclamped position wherein the anvil tips are moved forward and retracted laterally and a clamped position wherein the anvil tips are moved inward and rearward into juxtaposition directly in front of the bonding tip for sandwiching and clamping the overlapped tying tape in the bonding zone between the anvil blade tips and bonding tip,
    J. a forwardly resiliently biased retracting arm pivotally mounted in the housing provided with means connecting its free end to the anvil blades and with the arm being movable between a forward position wherein the anvil blade tips are laterally retracted forward, and a rear latched position wherein the anvil blade tips are drawn back into their clamped position, K. means operatively connecting the cutter to the arming linkage and positioning the cutter in its retracted position when the movable jaw is closed and in its forward position when the movable jaw is open, L. control means responsive to the completion of the tape feeding forward drive mode operation and thereafter propelling the retracting arm to its rear latched position clamping the anvil blade tips against the overlapped tape to actuate timing means initiating reverse mode tape tautening, and then energizing the transducer to bond the overlapped tape, M. and actuator release means responsive to completion of the tape-bonding operation of the transducer and connected to unlatch the depressed actuator releasing the retracting arm from its latched rear position which then moves the cutter forward to sever the rearmost layer of tape while opening the anvil tips and the movable jaw to release the wrapped and tied bundle.

2. The automatic tying tool defined in claim 1 wherein the tape storage spool is rotatably mounted on a tape-dispensing and slack tape-rewinding hub assembly comprising a support arm extending rearward from the housing, a fixed hub projecting from the support arm across the rear end of the housing, a hollow conically tapered spool drum having annular end walls forming bearing discs rotatably mounted on the hub, means forming a plurality of resilient vanes protruding radially from the spool drum, a tape storage spool having a hollow conically tapered bore dimensioned for telescoping sliding engagement on the spool drum by which the resilient protruding vanes are inwardly depressed, and a rewinding torsion spring having one end anchored to the spool drum and the other end grippingly engaging the hub whereby the dispensing withdrawal of tape stored on the spool initially rotates the spool and the spool drum relative to the hub, storing energy in the torsion spring until the limit of static friction between the spool and the spool drum is exceeded, after which the spool slidingly rotates relative to the spool drum as tape dispensing withdrawal continues, and whereby relaxation of tape tension causes reverse rotation of the spool drum and spool relative to the hub, rewinding slack tape on the spool and avoiding loops or tangles of slack tape.

3. The automatic tying tool defined in claim 1 wherein the anvil blades are each pivotally connected to a yoke which is itself pivotally connected to the housing and angularly movable from a converging position, drawing the anvil blades back to their clamped position, to an outspread position, in which the anvil blades are laterally retracted forward, withdrawing their tips from under the wrapping tape welded around the bundle and thereby freeing the bundle for release from the tool.

4. The automatic tying tool defined in claim 1 wherein the forward end of each anvil blade is provided with protruding follower stud means cammingly engaged with forwardly diverging camming slot means formed in the housing, whereby the anvil blades are guided between their rearward clamped positions and their outspread, laterally retracted forward position.

5. The automatic tying tool defined in claim 1 wherein the anvil tips are provided with transverse ridges enhancing their clamping grip exerted on the tape during its tautening retraction by reverse mode operation of the drive means.

6. The automatic tying tool defined in claim 1 wherein the bonding tip of the transducer is provided with a central ridge aligned with the length of the tape clamped in the bonding zone.

7. The automatic tying tool defined in claim 6 wherein the transducer's central ridge is flanked by raked surfaces incorporating grooves substantially parallel to the central ridge.

8. The automatic tying tool defined in claim 1 wherein the anvil blades are each provided with tape guide shoulders flanking the bonding zone, whereby tape layers positioned in the bonding zone are maintained in substantial overlapping alignment.

9. The automatic tying tool defined in claim 1 wherein the housing incorporates an upstanding rigid partition wall subdividing the hollow housing into two compartments, with the ultrasonic transducer and the resiliently biased retracting arm being sturdily supported by the rigid partition wall.

10. The automatic tying tool defined in claim 9 wherein the rigid partition wall is provided with a lateral tape-threading slot extending from its central region to one side edge aligned with tape-threading slot means formed in the housing extending from the vicinity of the tape storage spool to the vicinity of the fixed jaw.

11. The automatic tying tool defined in claim 1, including tape-threading slot means formed in the housing extending from the vicinity of the tape storage spool to the vicinity of the fixed jaw, and a tape driving pinch roll assembly having one roll disengageable to receive the end of a tying tape being threaded from the spool to the fixed jaw.

12. The automatic tying tool defined in claim 1 wherein the fixed jaw and the movable jaw are both removably anchored to the housing, whereby they may be removed and replaced by cooperating jaws of the same or of different sizes whenever desired.

13. The automatic tying tool defined in claim 1 wherein the movable jaw is provided with a movable flange assembly pivotally mounted thereon and comprising a pair of flange plates having converging tips flanking the movable jaw and unitarily movable between a stowed position beside the movable jaw toward which the flange plates are resiliently biased with their inner edges protruding radially inward to form tape feeding guides, and a deployed position with their converging tips pivoted toward the bonding zone into contact with the bundle in the bundle-tying zone, with the spacing between the converging tips being less than the tape width, whereby the tape being drawn around the bundle wedges between the converging tips to overcome the resilient biasing force and draw the flange plates toward the bundle, and then flexes to squeeze between the converging tips, releasing the flange plates to return to their stowed position.

14. The automatic tying tool defined in claim 1 wherein the means connecting the retracting arm. to the anvil blades comprises a resilient spring whereby the clamping force exerted on the tape by the anvil blades is cushioned as the anvil blades are drawn back into their clamped position.

15. The automatic tying tool defined in claim 1 wherein the housing encloses
   a voltage regulator circuit,
   a reversible D.C. motor connected to provide driving torque for the tractive tape drive,
   a transducer-energizing oscillator circuit,
   and control circuitry connecting and governing the operation of the tool,
whereby power delivered by a power cord to the tool provides all power needed to operate the tool, and actuation of the actuator starts the operating cycle, which continues automatically to completion.

16. The automatic tying tool defined in claim 1, further including means monitoring the length of tape drawn back during tape tautening reverse mode operation and having a selectable predetermined limit and connected to abort the tying operation and release the bundle without tape-bonding when the limit is exceeded because an undersized bundle has been presented for tying.

17. A portable automatic bundle-tying tool for wrapping flexible plastic tape around a bundle of wires or similar elongated objects, drawing the tape taut to compress the bundle, bonding the overlapped tape and then severing the bonded tape to release the wrapped bundle, comprising
   A. a pistol-grip housing having a hollow cental enclosure, and a movable trigger resiliently depressible from a forward position to a depressed latched position,
   B. a tape-guiding fixed jaw protruding from the forward end of the housing,
   C. a tape-guiding movable jaw pivoted at the forward end of the housing for movement between an open position spaced away from the fixed jaw and a closed position abutting the fixed jaw in which means forming inward-facing, tape-guiding grooves in both jaws are aligned to encircle a bundle-tying zone,
   D. a resiliently biased tape-rewinding tape storage spool rotatably mounted on the rear of the housing,
   E. an arming linkage inside the hollow housing operatively connecting the trigger to close the movable jaw and incorporating an arming kicker strut moved rearwardly when the trigger is depressed to its latched position,
   F. drive means in the housing having a forward mode tractively drawing flexible plastic tape from the tape storage spool and feeding it endwise via the tape guiding grooves to encircle the tying zone with at least one layer of tape whose leading end is thence returned to overlap itself in a tape bonding zone, and a reverse mode retracting the tape to draw the tape around the bundle,
   G. an ultrasonic transducer anchored in the housing and having a bonding tip protruding into the bonding zone,
   H. a tape cutter mounted near the bonding tip for movement between a forward position protruding into the bonding zone and a rearward retracted position,
   I. a pair of tape-clamping anvil blades having thin beveled tips flanking the transducer's bonding tip and movable between an unclamped position wherein the anvil tips are moved forward and retracted laterally and a clamped position wherein the anvil tips are moved inward and rearward into juxtaposition directly in front of the bonding tip for sandwiching and clamping the overlapped tying tape in the bonding zone between anvil blade tips and bonding tip,
   J. a forwardly resiliently biased retracting arm pivotally mounted in the housing provided with means connecting its free end to the anvil blades and with a kicker plate engageable with the kicker strut, the arm being movable between a forward position wherein the anvil blade tips are laterally retracted forward, and a rear latched position wherein the anvil blade tips are drawn back into their clamped position, with the kicker plate moved rearward past the kicker strut which is resiliently biased into the path of the kicker plate and thereby holds the retracting arm depressed and the anvil blade tips closed,
   K. means operatively connecting the cutter to the arming linkage and positioning the cutter in its retracted position when the movable jaw is closed and in its forward position when the movable jaw is open,
   L. control means responsive to the completion of the tape feeding forward drive mode operation and thereafter propelling the retracting arm to its rear latched position clamping the anvil blade tips against the overlapped tape to actuate timing means initiating reverse mode tape tautening, and then energizing the transducer to bond the overlapped tape,
   M. and trigger release means responsive to completion of the tape-bonding operation of the transducer and connected to unlatch the depressed trigger, releasing the retracting arm from its latched engagement latched rear position with the kicker strut which then moves the cutter forward to sever the rearmost layer of tape while opening the anvil tips and the movable jaw to release the wrapped and tied bundle.

* * * * *